United States Patent [19]
Clover, Jr. et al.

[11] Patent Number: 6,058,674
[45] Date of Patent: May 9, 2000

[54] STRUCTURAL MEMBERS FOR USE IN WHEELCHAIRS

[75] Inventors: William M. Clover, Jr., Buffalo, Minn.; Vladimir Sarpe, W.V.C., Utah

[73] Assignee: TekSource, LC, Draper, Utah

[21] Appl. No.: 09/072,621

[22] Filed: May 4, 1998

Related U.S. Application Data

[60] Provisional application No. 60/045,605, May 5, 1997.

[51] Int. Cl.$^7$ ........................................................ E04C 3/30
[52] U.S. Cl. .................... 52/731.1; 52/735.1; 52/717.05; 52/717.03; 52/740.4; 52/740.6
[58] Field of Search ................................ 52/739.1, 735.1, 52/309.1, 309.2, 717.05, 717.03, 731.1, 740.1, 740.4, 740.6; 425/577; 264/318; 428/358, 397, 399, 181

[56] References Cited

U.S. PATENT DOCUMENTS

| | | | |
|---|---|---|---|
| 843,843 | 2/1907 | Reavis | 52/740.4 |
| 1,032,856 | 7/1912 | Pagelsen | 52/740.4 |
| 1,514,806 | 11/1924 | Thomas | 52/740.4 |
| 2,377,335 | 6/1945 | Finlayson et al. | 52/309.2 X |
| 2,636,189 | 4/1953 | Feldman | 52/717.05 X |
| 4,083,592 | 4/1978 | Rubin et al. | 52/717.05 |
| 4,123,887 | 11/1978 | Weinar | 52/739.1 |
| 4,385,476 | 5/1983 | Slager | 52/494 |
| 4,899,515 | 2/1990 | Potucek | 52/740.1 |
| 5,464,240 | 11/1995 | Robinson et al. | 280/281.1 |
| 5,603,520 | 2/1997 | Pearce | 280/250.1 |
| 5,617,699 | 4/1997 | Thompson, Jr. | 52/786.13 |

FOREIGN PATENT DOCUMENTS

| | | | |
|---|---|---|---|
| 560362 A2 | 9/1993 | European Pat. Off. | 52/720.1 |
| WO 94/11590 | 5/1994 | WIPO | 52/720.1 |

*Primary Examiner*—Carl D. Friedman
*Assistant Examiner*—Brian E. Glessner
*Attorney, Agent, or Firm*—Daniel McCarthy; Brick Power; Frederick W. Niebuhr

[57] ABSTRACT

A structural member for use in a wheelchair which includes an elongate section having side members connected by at least one central member and movement accommodating channels. Preferably, the elongate section has a W-shaped cross-sectional configuration. The preferred cross-section has a generally round outline. The preferred wheelchair structural member also includes a mechanism for imparting torsional stiffness thereto. Preferably, that mechanism includes stiffening disks which have a solid, circular cross-sectional appearance, and which are formed integrally with the elongate section. Similarly, the preferred structural member may include a mechanism for imparting bending strength. Stiffening disks, as well as increased cross-sectional diameter and increased wall thickness may be used to reduce the tendency of a structural member to bend. A preferred injection molding method and the preferred use of fiber-reinforced plastic materials are also disclosed.

20 Claims, 14 Drawing Sheets

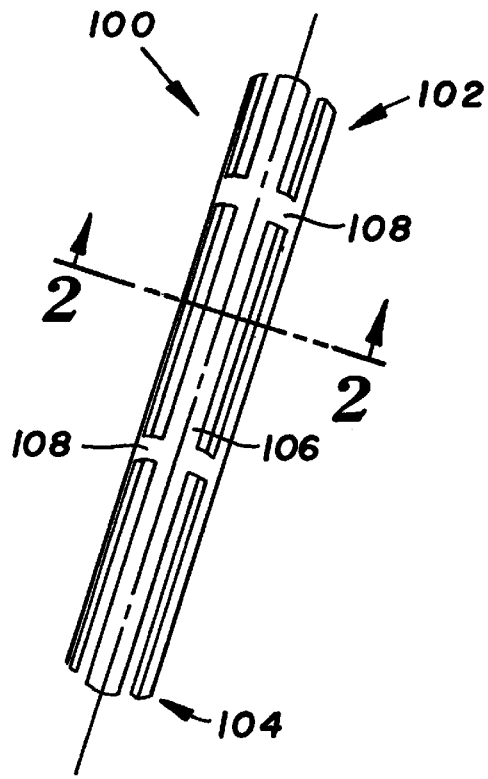
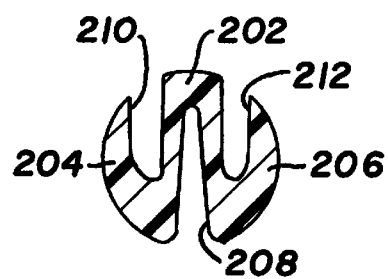
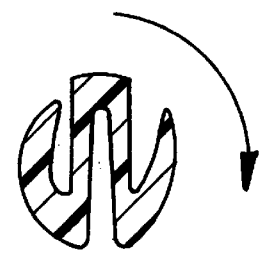
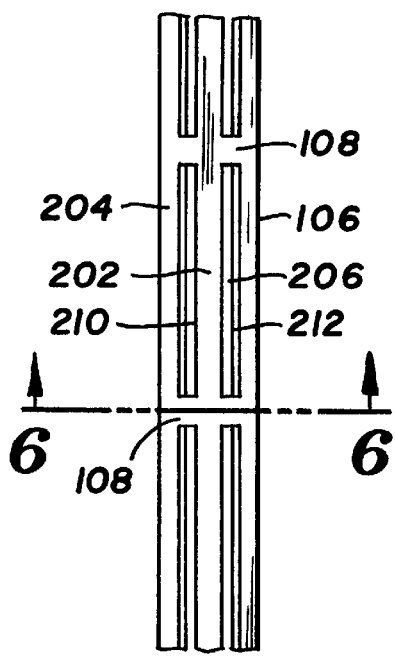
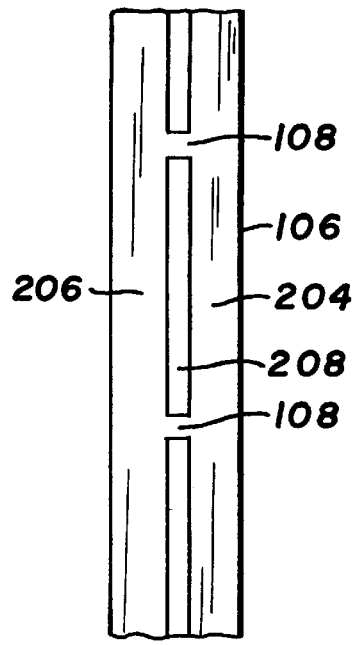
FIG. 1
FIG. 2
FIG. 3
FIG. 4
FIG. 5

STRUCTURAL MEMBERS FOR USE IN WHEELCHAIRS

This application claims the benefit of Provisional Application Ser. No. 60/045,605 entitled "Structural Members for use in Wheelchairs, filed May 5, 1997.

I. BACKGROUND OF THE INVENTION

A. Field of the Invention

The present invention relates to elongate structural members having W-shaped cross-sections with a rounded, circular appearance and a generally circular outline. More particularly, the preferred structural members of the present invention are manufactured from fiber-reinforced plastics. The structural members of the present invention are useful in wheelchairs, particularly as wheelchair push handles and wheelchair cross-brace seat support members. The inventive concept may be incorporated into many different physical configurations, however. Some embodiments of the invention also include stiffening disks for limiting the amount of torsional movement and bending the structural member is capable of.

B. Related Art

For the purposes of this patent, the types of movement of elongate members are discussed. The first is longitudinal displacement, or displacement along the longitudinal axis of a structural member. Longitudinal displacement is usually found in soft materials such as rubber. The second is torsional movement, or twisting about the longitudinal axis of the member. The third is bending along the longitudinal axis of the structural member, or deflection of a portion of the structural member away from its longitudinal axis. Many structural members are stiff tubular members which have little or no torsional or bending ability. Such structural members are not capable of sufficient flexion or torsional movement for many applications. Thus, those structural members lack adequate shock absorbing characteristics for many applications.

Many light weight structural members in the prior art are expensive to manufacture. This is especially true of many wheelchair structural members. For example, when aluminum tubing is used to make wheelchair push handles, the aluminum must be bent and machined. Filament winding, composite lay up and some other methods for forming composite products are also undesirable since they are generally time consuming and expensive. Similarly, the manufacture and assembly of multiple parts tends to be more labor intensive and expensive than the manufacture and assembly of fewer parts. In comparison, the preferred wheelchair push handles of the present invention cost about sixty percent (60%) or less to manufacture than similar parts made from aluminum tubing. When compared with similar parts made by filament winding or composite lay up, products made in accordance with the preferred configuration and methods of the present invention represent even greater manufacturing cost savings.

The following U.S. Patents, which disclose structural or strengthening members with a W-shaped cross-section, may also be of interest to the reader: U.S. Pat. Nos. 5,595,800, issued in the name of Stanley W. O. Menzel; 5,560,672, issued in the names of George G. Lim, Clifford C. Chow and Alan A Kinnelly; 5,415,301, issued in the names of John Bruton and Julian De Salis; 5,295,446, issued in the name of Gerhard Schäfer; 5,291,716, issued in the names of Peter O. Broberg, Find Madsen and Jorgen H. Christensen; and 4,351,244, issued in the name of James M. Suttles; 3,768, 423, issued in names of James M. Cook, III and Eugene Dow.

The '800 patent describes a flexible reinforcing member for strengthening helically wound composite structures. The '672 patent discloses a structural member with hinge points that facilitate plastic deformation of the member. The '301 patent discloses a structural member having opposing sides which each have a W-shaped cross-section. The '446 patent describes hollow shelf posts with a W-shaped cross-section. The '716 patent describes a structural assembly for constructing buildings which includes a sectional element having a W-shaped cross-section. The '244 patent discloses a shelving system with corner posts having a W-shaped cross-section. The '423 patent discloses a pallet having strengthening ribs with a W-shaped cross-section.

Each of these patents describes strengthening or structural members having a W-shaped cross-section with flat members which join at angular corners. Thus, the structural members described in those patents are more likely to collapse under transverse side loads than prior art tubular members and the structural members of the present invention. None of these patents discloses a W-shaped cross-section which has a rounded cross-sectional outline. Thus, such structural members cannot be easily integrated into many apparatus to replace existing tubular parts. Nor does any of the patents describe the use of a mechanism for controlling the amount of torsional and bending movement of which the structural member is capable.

Torsional and bending movement is sometimes a desirable feature in structural members. Consequently, such structural members have the ability to absorb shock from a transverse impact. Such pylons include flat elongate members, elongate members with a U-shaped cross-section, and the use of two or more elongate members of different thicknesses. However, the amount of torsion and bending of many of those structural members cannot be controlled.

The following U.S. Patents, which disclose prosthetic pylons, represent some of the structural members which are capable of torsional and bending movement. U.S. Pat. No. 4,959,073, issued in the name of John Merlette, discloses a flat elongate member which includes a layer of diagonally oriented fibers on at least the front and back surfaces thereof. The layer of diagonal fibers provides torsional stiffness control and stability to the pylon.

While the prosthetic pylon described by the '073 patent may be capable of torsional rotation and has some flexibility, the use of a flat member may generate too much torsion and flexion for many users. Further, the torsional stiffness of that pylon is controlled only by variation of the materials used in the manufacture thereof.

U.S. Pat. No. 4,547,913, issued in the name of Van L. Phillips, describes a prosthetic foot and leg having a flat, elongate pylon. The leg of the '913 patent is formed from a synthetic resin impregnated high strength filament. The '913 patent discloses the ability of that pylon to rotate under torsional stress. However, no mechanisms are disclosed for tailoring the amount of torsion or flexion of which that pylon is capable to the needs of particular users.

U.S. Pat. No. 4,822,363, issued in the name of Van L. Phillips, discloses a modular prosthetic leg which has a generally flat, elongate pylon. This shape facilitates torsional rotation of the pylon. The preferred embodiment of the pylon of the '363 patent fabricated from filamentary laminates. Various embodiments of the pylon provide the desired characteristics for a wide range of users' weights and activity levels. However, the various embodiments merely include alternatives on the size of the pylon and the materials used to manufacture the pylons.

U.S. Pat. No. 5,156,631, issued in the name of John Merlette, describes a foot and leg prosthesis having a pylon, or shank strut section, having a U-shaped cross-section. The '631 patent notes that the U-shaped cross-section, in combination with the use of a unidirectional fiberglass composite, provides bending stiffness. The preferred use of cross-plied woven fabric at the surface of the pylon also imparts it with torsional stiffness.

However, as with the pylons having elongate flat members, the U-shaped cross-section pylon of the '631 patent may have too much torsion and flex for many users. The '631 patent also lacks disclosure about mechanisms for controlling the stiffness of the pylon structural member.

U.S. Pat. Nos. 5,217,500 and 5,464,441, both issued in the name of Van L. Phillips, each disclose a prosthetic leg pylon having at least one elongate leg element which is capable of responding to stress. Mr. Phillips prefers that the pylon include two elongate leg elements which are attached to one another. A spacer may also be attached between the leg elements. Both the '500 patent and the '441 patent note that the use of more than one leg element provides a pylon with more flexibility than single element pylons of equivalent cross-sectional area. The use of multiple elongate elements and spacers is undesirable since it increases manufacturing costs significantly.

U.S. Pat. No. 5,314,499, issued in the name of Milo S. Collier, Jr., discloses a prosthesis which includes, among other things, a shin having two rods. Mr. Collier prefers that the rods have some flexiblity and different diameters in order to represent the tibia and fibula of the human lower leg. The configuration and flexibility of the rods impart the shin with the ability to twist and flex slightly. Again, the use of multiple pieces creates a significant increase in manufacturing cost.

3 U.S. Pat. No. 5,509,936, issued in the names of Albert Rappoport and Jerome P. Voisin, describes a leg prosthesis having a dual leaf spring configuration. The flat, elongate leaf springs are curvilinear, and are positioned such that they bow away from one another. This leaf spring configuration facilitates torsional movement of the leg, along with compression and flexion of the prosthetic leg in the fore and aft directions. However, the multiple pieces of the pylon of the '936 patent significantly increase its cost of manufacture over single-member pylons. Further, compression is often undesirable in prosthetic pylons since natural limbs have little or no compressibility.

Applicants are aware of several prior art wheelchairs. For a general background concerning wheelchairs, wheelchair componentry and related componentry, the reader is directed to the following U.S. Pat. Nos. Re. 32,242, issued in the name of Minnebracker; D. 306,712, issued in the name of Friedrich; 2,425,574, issued in the name of Stewack; 2,824,597, issued in the name of Lerman; 3,356,185, issued in the name of Isaacks; No. 3,618,968, issued in the name of Green; 3,897,857, issued in the name of Rodaway, 3,901,527, issued in the names of Danziger et al.; 3,964,786, issued in the name of Machuda; 4,280,595, issued in the names of Timms et al.; 4,431,076, issued in the name of Simpson; 4,489,955, issued in the name of Hamilton; 4,500,102, issued in the names of Haury et al.; 4,501,033, issued in the names of Kessel et al; 4,593,929, issued in the name of Williams, 4,598,944, issued in the name of Meyer, 4,652,005, issued in the name of Hartwell; 4,733,755, issued in the name of Manning; 4,768,797, issued in the name of Friedrich; 4,953,913, issued in the name of Graebe; 4,989,890, issued in the name of Lockard; 5,028,065, issued in the name of Danecker; 5,060,962, issued in the name of McWethy; 5,074,620, issued in the names of Joy et al.; 5,120,071, issued in the name of Thibault; 5,152,543, issued in the names of Sims et al.; 5,176,393, issued in the name of Robertson; 5,203,433, issued in the name of Dugas; 5,242,179, issued in the names Beddome et al.; 5,249,847, issued in the name of Lee; 5,253,888, issued in the name of Friedrich; 5,379,866, issued in the names of Pearce et al.; and 5,603,520, issued name of Pearce.

Applicants are also aware of several prior art structural members which are manufactured from molded plastic materials, including frame members for wheelchairs and bicycles. For a general background of such structural members, the reader is directed to the following U.S. Pat. Nos. 3,533,643, issued in the name of Yamada; 4,067,589, issued in the name of Hon; 4,548,422, issued in the names of Michel et al.; 4,550,927, issued in the name of Resele; 4,593,929, issued in the name of Williams; 4,865,337, issued in the name of Disler; 5,011,172, issed in the names of Bellenca et al.; 5,092,614, issued in the name of Malewicz; 5,253,888, issued in the name of Friedrich; and 5,464,240, issued in the names of Robinson et al. French patent no. 895046, Italian patent no. 448310 and United Kingdom patent no. 191193, issued in 1895, may also be of interest to the reader.

What is needed is a rigid structural member which i is relatively inexpensive to manufacture, preferably by injection molding of a fiber reinforced material. A mechanism is needed for imparting torsional and bending stiffness to the structural member. A structural member which may be readily integrated into existing apparatus designs is needed. A structural member is also needed which resists compression and absorbs transverse shocks. The prior art does not fill these needs.

II. SUMMARY OF THE INVENTION

The present invention addresses each of the foregoing needs. The preferred invented structural member is also less expensive to manufacture than many existing structural members because it is readily adaptable to be manufactured by injection molding. The preferred structural member of the invention is a rigid elongate member having a W-shaped cross-section. A preferred embodiment of the structural member also includes a mechanism for controlling the torsional and bending stiffness thereof. The structural member may be readily integrated into the existing structure of many apparatus. The preferred structural member of the invention is constructed in a manner which resists compression and vertical displacement along its vertical axis.

A reduction in manufacturing costs relative to those of many other comparably dimensioned structural members is a farther advantage of the structural member according to the present invention. The preferred unitary structure of the structural member and the preferred use of injection molding methods both reduce the costs of manufacture. Consequently, the structural member is less expensive to manufacture than many structural members in the prior art. The preferred cross-sectional shape of the invented structural member readily accommodates manufacturing by injection molding.

It is an object of the invention to provide a structural member that absorbs transverse shock. Features of one preferred embodiment of the present invention include a rounded W-shaped cross-section with thin walls. The W-shaped cross-section imparts the structural member with compressional rigidity, while the thin walls of the W-section impart it with the ability to absorb transverse shock. A preferred structural member of the invention is made of fiber reinforced plastic, which has good shock absorbing characteristics. It is a consequent advantage that the structural member of the present invention absorbs transverse shock.

It is an object of the invention to provide a mechanism for controlling the torsional stiffness of the structural member of the present invention. Stiffening disks located along a preferred embodiment of the present invention are a feature which increases the stiffness of the structural member. Preferably, the stiffening disks are formed integrally with the structural member at the time it is manufactured. The spacing of stiffening disks along the structural member determines the amount of torsional stiffness along various sections of the structural member. The preferred stiffening disks have a diameter substantially the same as that of the structural member and a thickness of about three-eighths inch (⅜"). Consequently, an advantage of the structural member according to the present invention is the ability to control the torsional stiffness thereof.

It is an object of the invention to provide a structural member which is easily integrated into existing apparatus. The round cross-sectional outline approximates the cross-sectional perimeter of prior art tubular structural members. Consequently, a structural member according to the present invention having similar dimensions may be used in place of the tubular members of an existing apparatus design.

It is an object of the invention to provide a structural member which resists compressional deformation or displacement along its longitudinal axis. The preferred embodiment of the invented structural member is an elongate member having a W-shaped cross-section. When the preferred rigid fiber reinforced plastic materials of the invention are used, the preferred structure resists compressional deformation. Thus, a consequent advantage of the structural member is its ability to resist compression and displacement along its longitudinal axis.

Further objects and advantages of the present invention will become apparent through a consideration of the ensuing description and appended drawings.

III. BRIEF DESCRIPTION OF THE DRAWINGS

FIG. 1 is a frontal perspective view of a preferred embodiment of the structural member of the invention;

FIG. 2 is a cross-section through line 2—2 of FIG. 1;

FIG. 3 is a representation of deformation caused by torsion of the cross-section shown in FIG. 2;

FIG. 4 is a frontal plan view of the embodiment shown in FIG. 1;

FIG. 5 is a rear plan view of the embodiment shown in FIG. 1;

IV. DETAILED DESCRIPTION OF THE PREFERRED EMBODIMENTS

Figure 6:
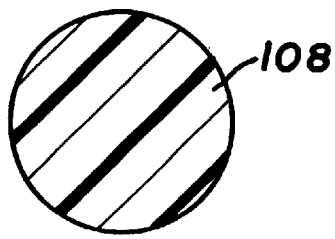
FIG. 6 is a cross-section through line 6—6 of FIG. 4.

Referring to FIG. 1, the structural member 100 of the present invention includes a first end 102, a second end 104, such as a prosthetic foot or hand, and an elongate section 106 oriented between the first and second ends along the longitudinal axis 109 of the structural member. Preferably, structural member 100 also includes stiffening disks 108 disposed along the longitudinal axis 109 and centered thereon.

FIG. 2 shows a preferred cross-sectional configuration of the elongate section, which has a rounded W-shape or M-shape. The preferred structural member according to the present invention is a continuous thin member which is formed into an elongate member having a generally circular outline and a W-shaped cross-section. This cross-sectional configuration includes a central member 202 and two side members 204 and 206. Three slots 208, 210 and 212 are also formed by the W—a central slot 208 is formed by the central member 202, and two side slots 210, 212 are formed between the central member and each of the sides 204, 206, respectively.

The open space of slots 208, 210 and 212 created by such a W-section decreases the weight of the section and the materials cost for manufacturing the section when compared with solid members of the same diameter and length. The W-section also provides improved torsion and bending over many solid and tubular structural members in the prior arts. However, the structural member of the present invention has increased torsional and bending stiffness over many flat, U-shaped, and other flexible structural members in the prior art.

The invented structural members have increased torsion over many of those in the prior art. A comparison between aluminum tubing and a preferred embodiment of a structural member according to the invention is provided below. However, when constructed by similar methods using similar materials and thicknesses, the structural members of this invention have less torsional and bending movement than others, such as the Merlette U-shaped structural member disclosed in the '631 patent and the flat members of the '073, '913, and '363 patents. The amount of torsion desired depends upon various factors, including the use for the structural member, the length of the structural member, the load to be placed upon the structural member, the diameter of the structural member, the thickness of the W-section, and others. Too much torsion creates stability problems in some uses. Too little torsion results in a structural member which will not absorb stress from impact or allow rotation of the structural member which is a desirable feature in other uses.

While the structural member of the present invention has more torsion than a tube of the same length, diameter, and made from the same materials, it has less torsion than the flat and U-shaped prior art structural members. As FIG. 2 shows, three slots 208, 210 and 212 are formed in the W-section. FIG. 3 illustrates that, as torsional stress is applied to side 204, the openings of slot 210 will close and the openings of slots 208 and 212 open slightly to facilitate torsional rotation of the structural member. In comparison, when equal torsional forces are applied to opposite sides of the structural member, or when a constant torsional stress is applied over the cross section of the structural member, little or no deformation of the cross-sectional shape will occur. Rather, the orientation of the cross-section will rotate. The resiliency of the preferred structural member materials cause the structural member to rebound to substantially its original shape and size following release of the torsional stress. The rigidity of the preferred material, as well as the placement and amount of material in the cross-section, resist deformation and provide torsional stiffness to the invented structural member. Nevertheless, in some instances, the amount of torsion exhibited by the structural member may be undesirably high. Thus, a mechanism for controlling the amount of torsion along the structural member may be desired.

A preferred mechanism for controlling the amount of torsion along the structural member includes the use of stiffening disks. Referring to FIGS. 4 and 5, the stiffening disks 108 of the invention preferably have a thickness of about ⅜ inch. In the preferred embodiment, stiffening disks are spaced about two inches apart, center to center, along the entire length of the elongate section 106. However, as those in the art will readily see, other thicknesses and spacing of stiffening disks 108 may be used to achieve different torsion and displacement bending, or flexion characteristics.

Stiffening disks are positioned along the length of the structural member of the invention in order to tailor the torsional stiffness of the structural member to the needs of a wide range of users. In the preferred embodiment, a generally consistent amount of torsion is desired along the length of the entire structural member. Thus, when used, the stiffening disks are spaced at even intervals along the structural member.

However, in some uses, it is conceivable that a consistent amount of torsion along the length of the structural member would not be desirable. Thus, for such uses, the mechanism for controlling torsion would vary the amount of torsion along different areas of the structural member. In the preferred configuration, the stiffening disks would be spaced unevenly along the structural member to achieve this effect.

The stiffening disks and structural member are preferably of unitary structure. In other words, in the preferred embodiment, the stiffening disks are formed integrally with the structural member when the structural member is injection molded. FIG. 6 shows a cross-section of stiffening disk 108, which is solid and has substantially the same outline shape as the W-shaped cross-sectional portions of the structural member.

Stiffening disks have much less torsion than the W-shaped cross-sectional areas of the structural member. Thus, when spaced along the structural member, stiffening disks segment the structural member into small W-section lengths. The shorter, isolated W-sections undergo less rotational deflection than would a longer section of the same cross-sectional dimension. The combined effect of the stiffening disks and the shorter W-sections is to decrease the overall amount of rotation and the overall torsion of the structural member. In determining the torsional stiffness of a structural member according to the invention, one must keep in mind the leveraging effect that a rigidly connected lateral extension will have on the structural member in exerting a torque load on the structural member.

As those of skill in the art will readily appreciate, torsional stiffness can also be varied by other mechanisms, including variation of the diameter of the structural member (i.e., the structural member's thickness, as measured with calipers), variation of the thickness of the each portion of the W, use of different materials, the use of multiple layers and others.

Figure 7:
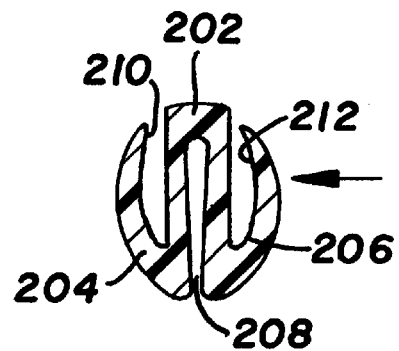
FIG. 7 is a representation of deformation caused by a lateral transverse load the cross-section shown in FIG. 2.
Figure 8:
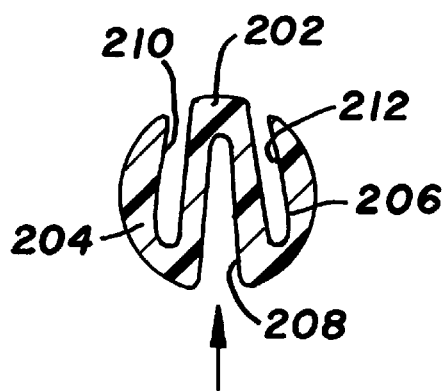
FIG. 8 is a representation of deformation caused by a transverse load exerted on the back of e cross-section shown in FIG. 2.
Figure 9:
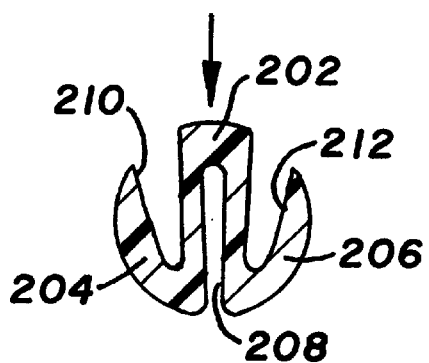
FIG. 9 is a representation of deformation caused by a transverse load exerted on the front of the cross-section shown in FIG. 2.
Figure 10A:
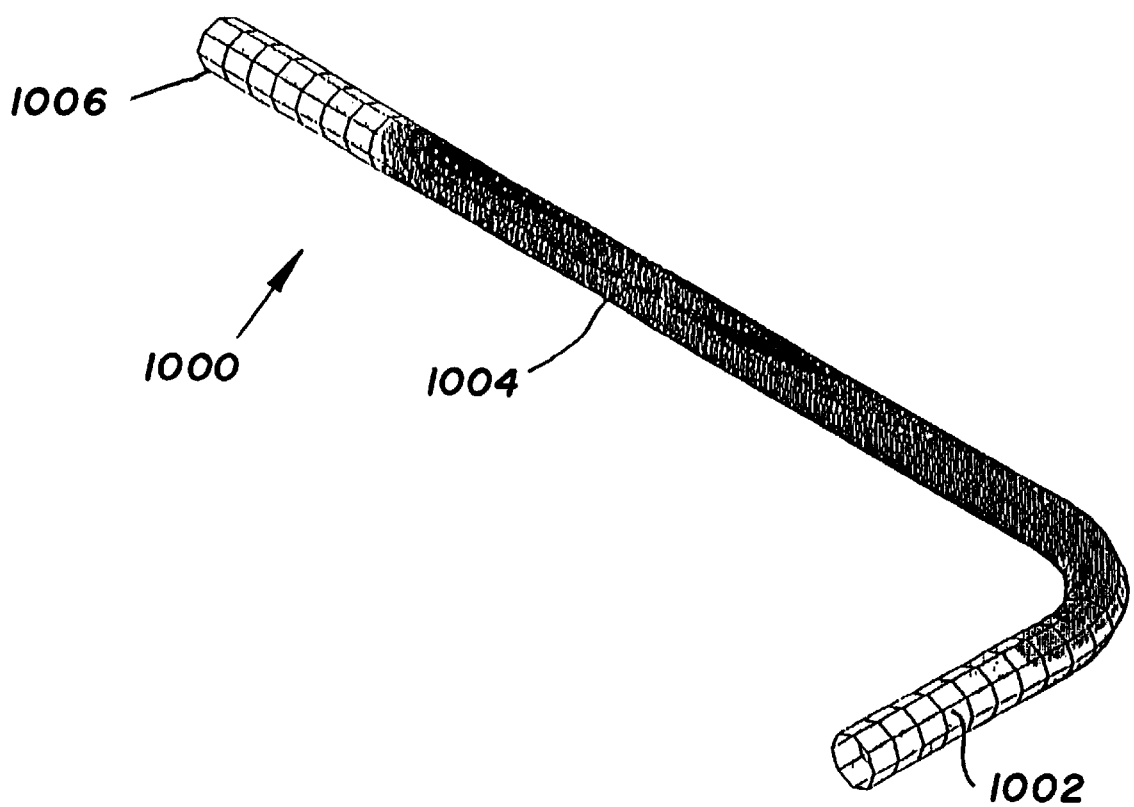
FIGS. 10a through 10h illustrate stress and displacement comparison test results between tubular aluminum structural members and structural members according to the invention.
Figure 10B:
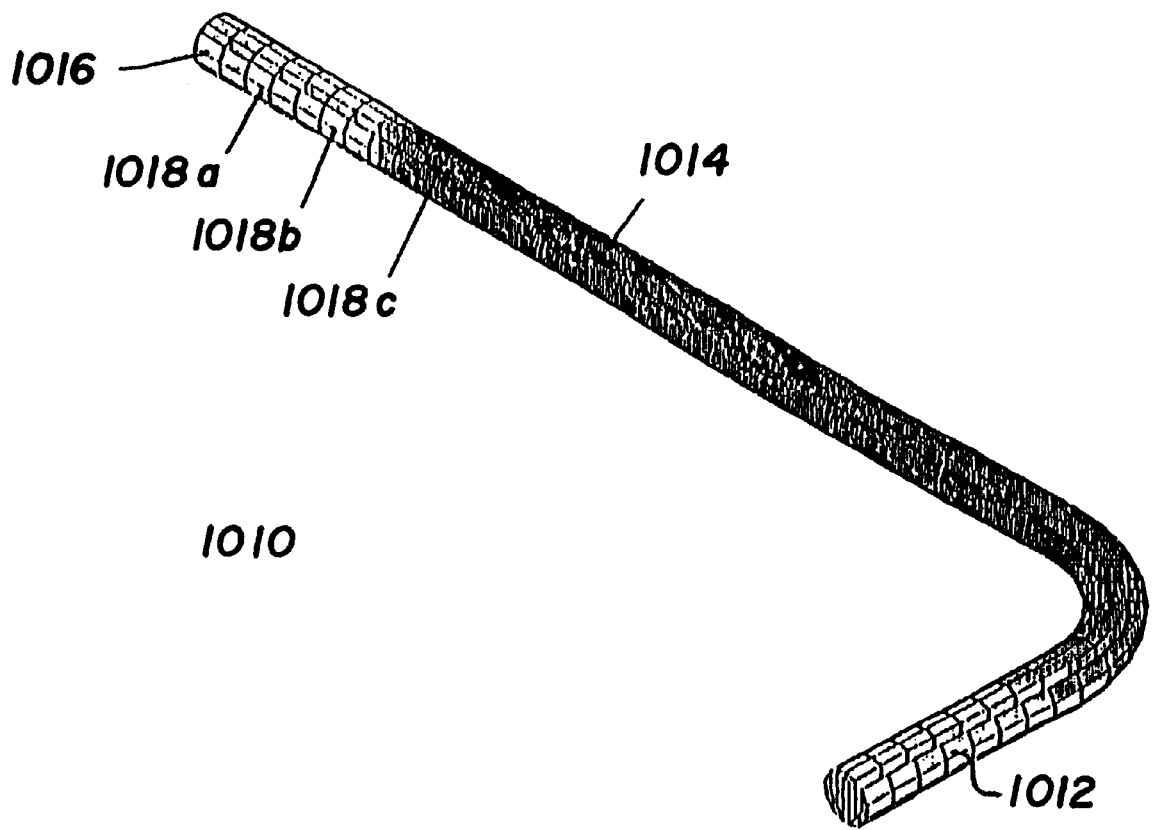
Figure 10C:
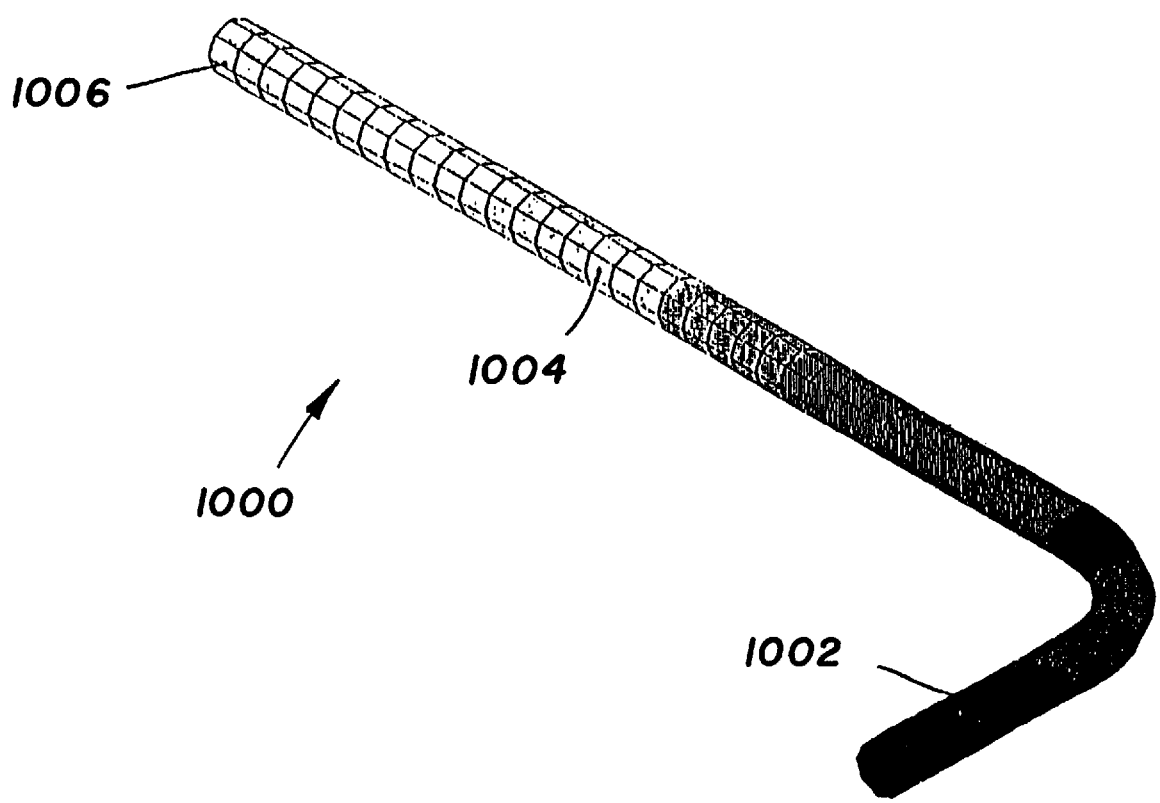
Figure 10D:
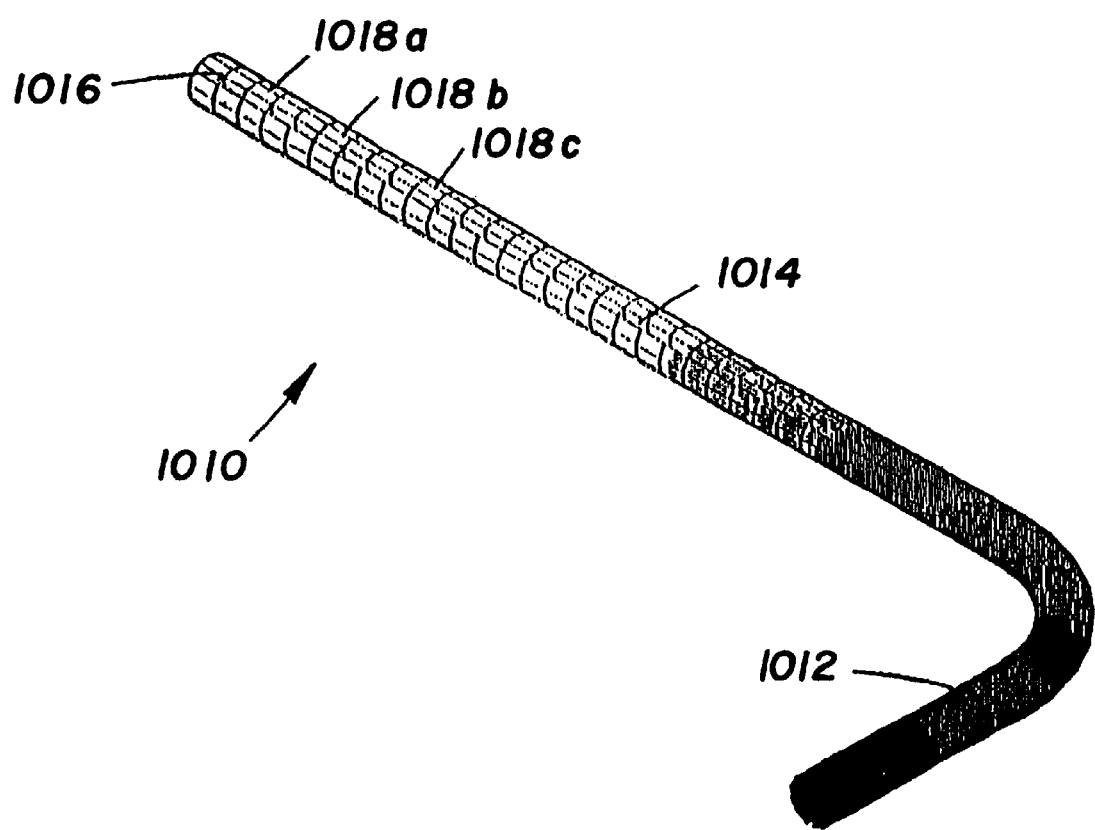
Figure 10E:
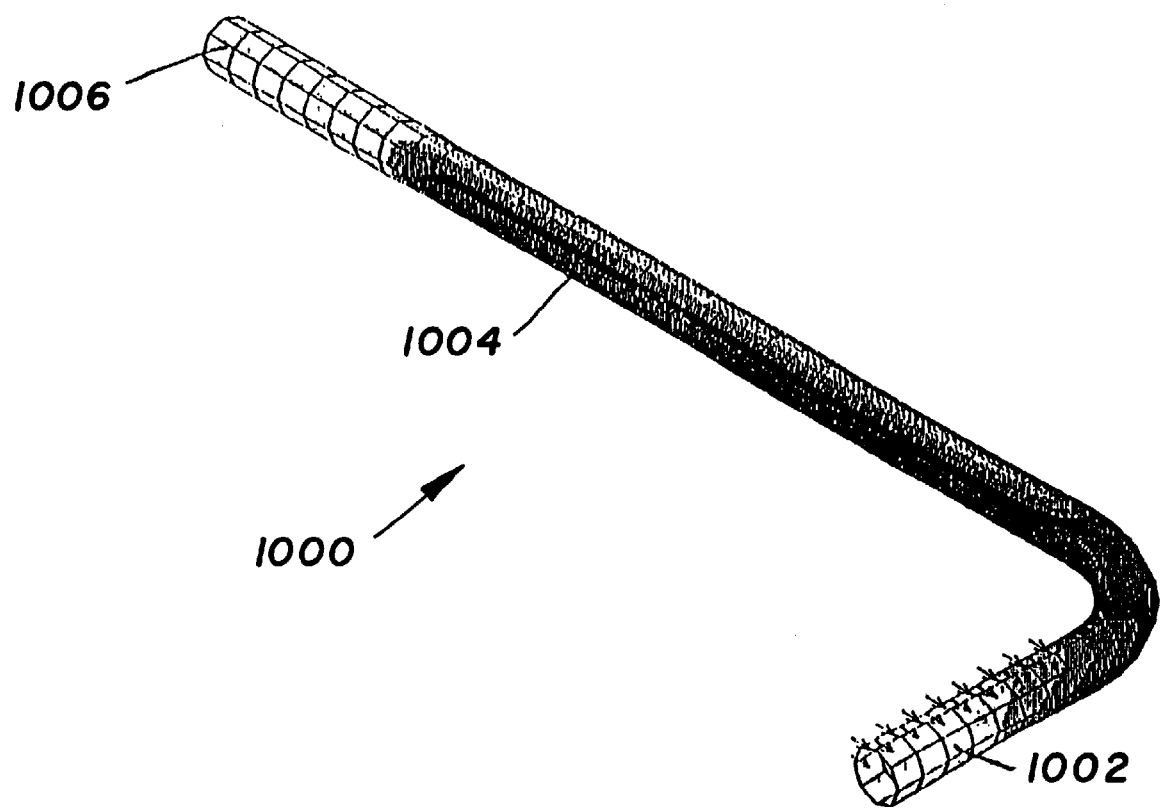
Figure 10F:
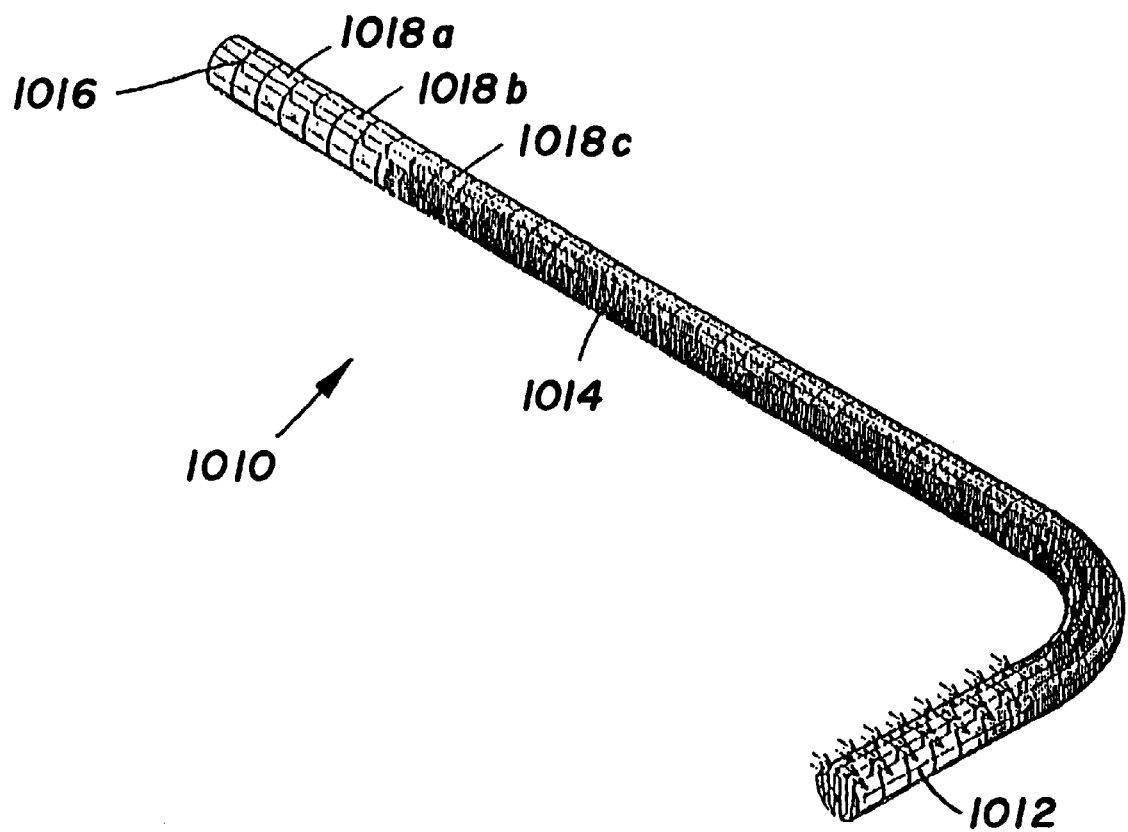
Figure 10G:
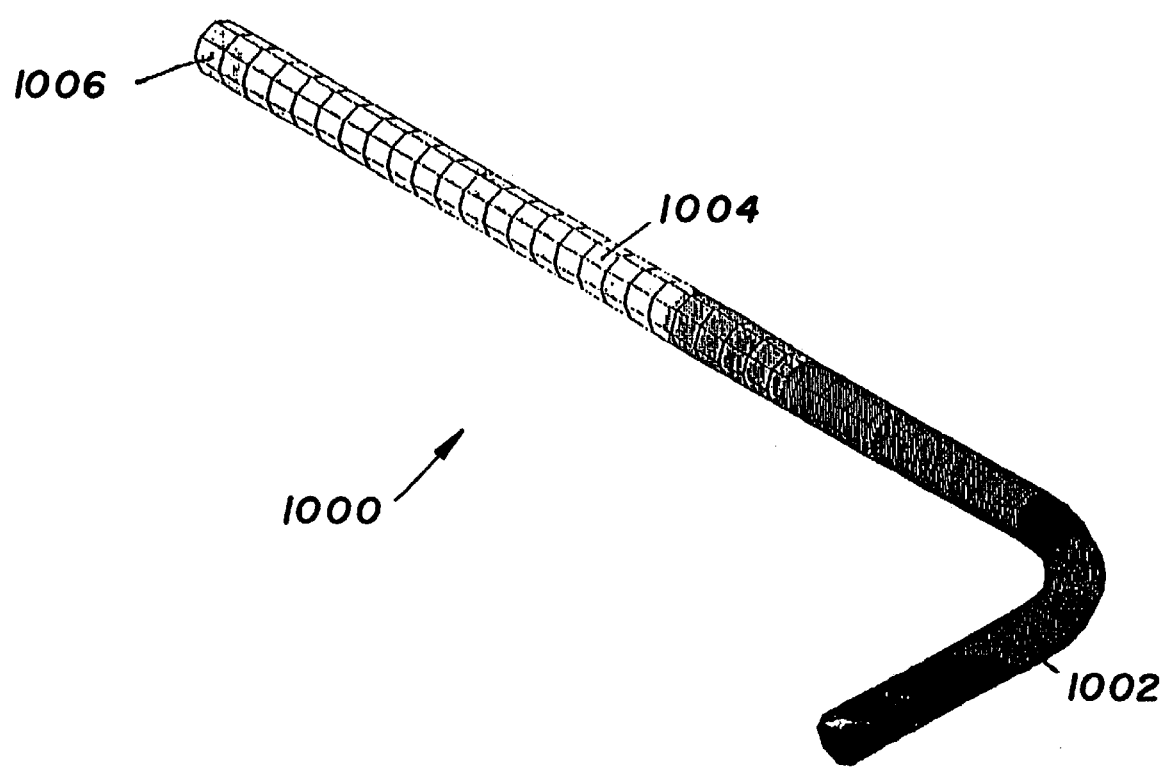
Figure 10H:
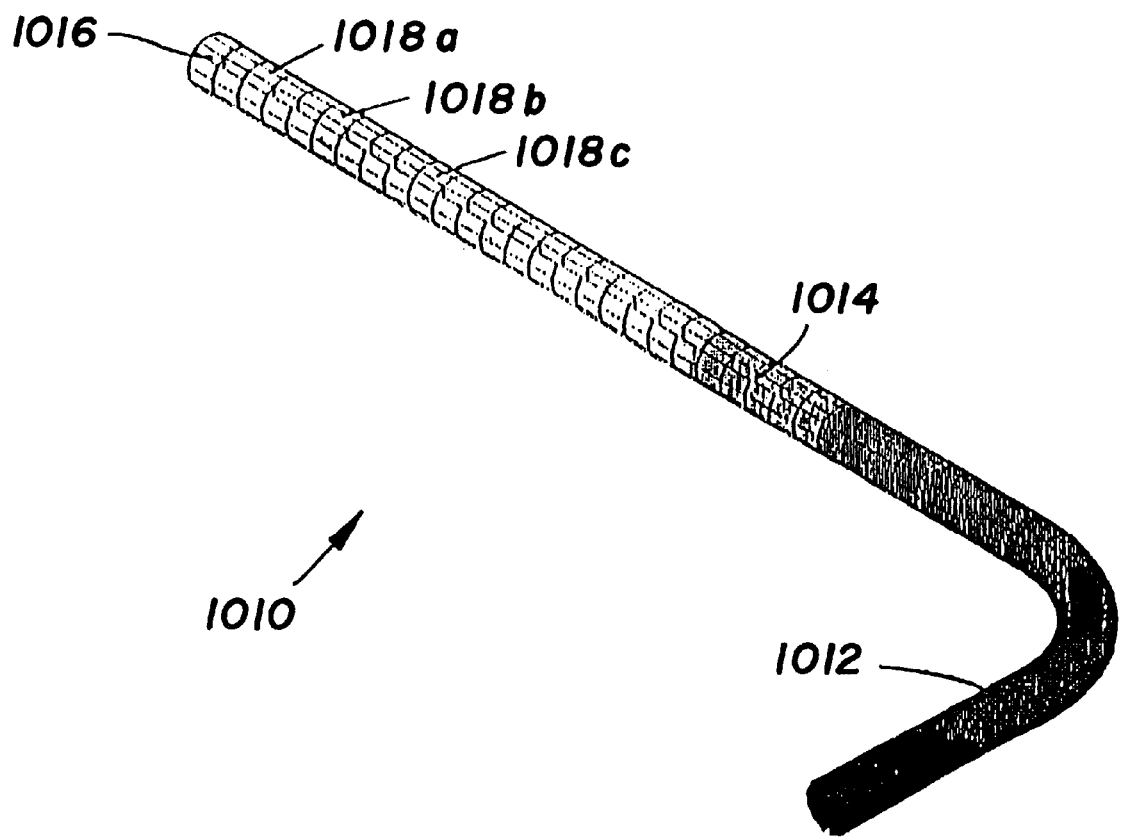

In some uses of the structural member of the present invention, it is desirable that the structural member bend, also referred to as flexion, under transverse loads. The bending stiffness of many prior art structural members cannot be tailored. When compared with an aluminum tube of approximately the same diameter and length, the W-shaped cross-sectional structural member demonstrates increased bending under a transverse load. Long sections of the W-shaped cross-section structural member of the invention undergo greater bending displacement under transverse load than do shorter sections of the same cross-section. With reference to FIG. 7, when the invented structural member is subjected to a transverse load from the side, represented by the horizontal, leftward pointing arrow, the slots 208, 210 and 212 compress to absorb load from side 206, which bends the structural member. Similarly, as FIGS. 8 and 9 show, when a load from the front, represented in FIG. 8 by the upward pointing arrow, or rear, represented in FIG. 9 by the downward pointing arrow, is exerted on the structural member, the shape of slots 208, 210 and 212 deforms allowing central member 202 to move in relation to side members 204, 206, which bends the structural member. A combination of these dimensional changes occurs when the structural member is placed under a transverse load from any other angle.

Stiffening disks disposed at intervals along the structural member separate the structural member into a plurality of shorter W-sections, which do not deform as readily as longer sections. The solid cross-section of the disks is also more resistant to deformation under a transverse load than the W-sections. Therefore, the distance the structural member is displaced, or the amount of bending and flexion of the structural member, when subjected to transverse loads may be tailored with stiffening disks.

As will be readily apparent to those of skill in the art, the bending stiffness and flexion of the structural member may be altered in other ways, including without limitation the use of different materials, increasing the cross-sectional diameter of the member, and others. For example, an increase in the thickness, or diameter, of the structural member will impart greater bending stiffness and less flexion to the member without creating a significant increase in torsional stiffness. Therefore, the bending strength and flexion of the structural members of the invention is not entirely dependent upon their torsional strength, and vice-versa.

With reference to FIGS. 10a through 10h, Applicants compared the torsional strength, torsional displacement, bending strength and bending displacement of an aluminum tube to a W-section structural member according to the invention. The comparison was conducted using computer generated models in COSMOS/M version 1.71, which is marketed by Structural Research and Analysis Corporation of Santa Monica, Calif. The aluminum tube 1000, shown in FIGS. 10a, 10c, 10e and 10g had a diameter of seven-eighths inch (⅞"), a wall thickness of about 0.062 inch, and a length of about twenty-four inches (24"). The tube was bent to form a handle 1002 having a length of about six inches (6") which was substantially perpendicular to an elongate member 1004 having a length of about eighteen inches (18").

FIGS 10b, 10d, 10f and 10h show the W-section 1010, which had the same length and shape as the aluminum tube, with a diameter of seven-eighths inch (⅞"), a wall thickness of about 0.120 inch, a three-eighths inch (⅜") thick solid section 1016 at the bottom of the member, and three-eighths inch (3/8") thick stiffening disks 1018a, 1018b, 1018c, etc. positioned every two inches along the length of the structural member 1014. The center of the first stiffening disk is spaced one inch (1") from the center of the solid section. The tested W-section was made from injection molded polyurethane reinforced with 40% long glass fibers.

Bending characteristic data were obtained by simulating 100 pounds force applied over the bottom surface of the handle (reference number 1002 of the aluminum tube and reference number 1012 of the W-section) and constraint of the bottom of the elongate member (reference number 1006 of the aluminum tube and reference number 1016 of the W-section) of both the aluminum tube 1000 and the W-section 1010, referred to as the first test scenario. Torsional characteristic data were obtained by simulating 100 pounds force applied across the side of the handle 1002, 1012, with the bottom 1006, 1016 of the elongate member 1004, 1014 being constrained. This is referred to as the second scenario. Stress values, in pounds per square inch (psi) were obtained using Von Mises' stress calculation, which determines the amount of stress applied each portion of the tested object. Displacement values are the distance the end of the handle moved when 100 pounds of force was applied to thereto. Table 1 shows the simulated stress and displacement of the aluminum tube and the W-section under each test scenario. The simulated tests also take into consideration the physical properties of the materials used.

TABLE 1

| | Torsional Stress | Torsional Displacement | Bending Stress | Bending Displacement |
|---|---|---|---|---|
| Aluminum Tube | $4.22 \times 10^4$ psi | 1.16 inches | $1.80 \times 10^4$ psi | 0.45 inch |
| W-Section | $4.30 \times 10^4$ psi | 6.14 inches | $2.50 \times 10^4$ psi | 2.04 inches |

Table 1 shows that the invented W-Section has greater torsional and bending displacement than an aluminum tube of similar dimensions, while undergoing a similar amount of stress.

Figure 11A:
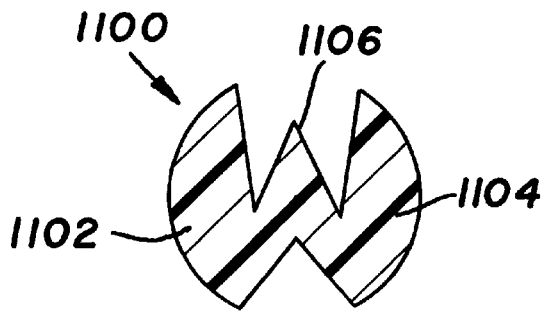
FIGS. 11a through 11j depict alternative cross-sections of structural members which can employ the inventive concept.

With reference to FIG. 11a, an alternative cross-sectional configuration 1100 of the invented structural member is shown. Configuration 1100 has a W-shaped appearance with two side members 1102 and 1104 which are connected by a V-shaped center member 1106. Preferably, the outer edges of side members 1102 and 1104 are curved, giving the cross-section of configuration 1100 a generally circular outline.

Figure 11B:
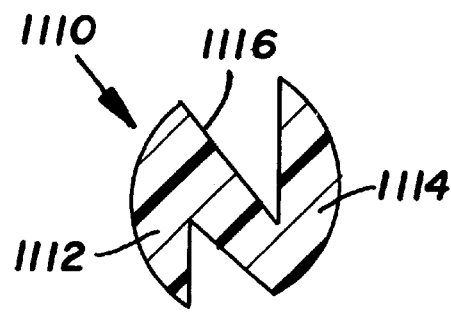

FIG. 11b shows a second alternative cross-sectional configuration 1110 of the invented structural member. Configuration 1110 has a N-shaped or Z-shaped appearance with two side members 1112 and 1114 which are connected by a diagonal center member 1116. Preferably, the outer edges of side members 1112 and 1114 are curved, giving the cross-section of configuration 1110 a generally circular outline.

Figure 11C:
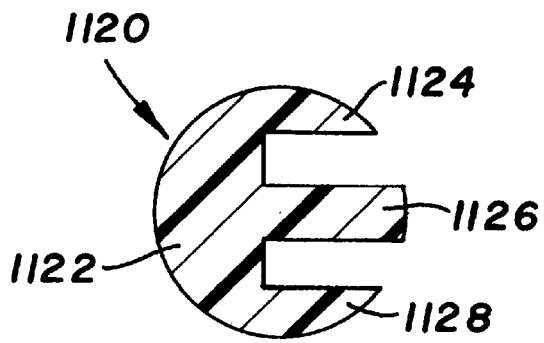

FIG. 11c depicts a third alternative cross-sectional configuration 1120 of the structural member of the present invention. Configuration 1120 has an E-shape and includes a partially circular side 1122 with three extensions therefrom 1124, 1126 and 1128. Preferably, side 1122, the outer edges of extensions 1124 and 1128, and the ends of extensions 1124, 1126 and 1128 are curved to give configuration 1120 a generally circular cross-sectional outline.

Figure 11D:
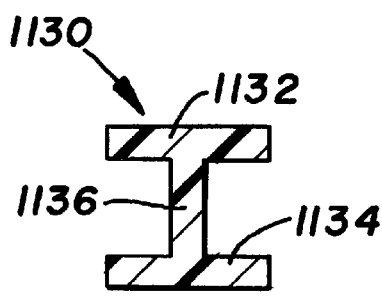

With reference to FIG. 11d, a fourth alternative cross-sectional configuration 1130 of the structural member has an I-shape. Configuration 1130 includes two members 1132 and 1134 which are parallel and which are joined by a central member 1136. Preferably, central member 1136 is substantially perpendicular to members 1132 and 1134.

Figure 11E:
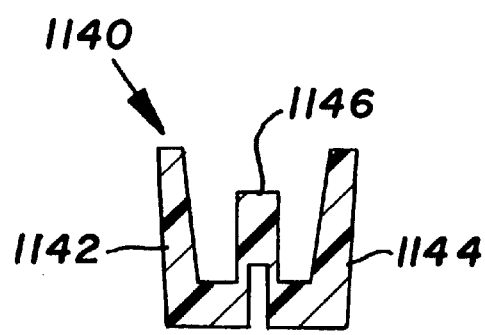

FIG. 11e illustrates a fifth alternative cross-sectional configuration 1140 of the structural member according to the present invention. Configuration 1140 has a W-shape, with two side members 1142 and 1144 which are connected by a center member 1146. The outer edges of sides 1142 and 1144 are substantially flat and straight.

Figure 11F:
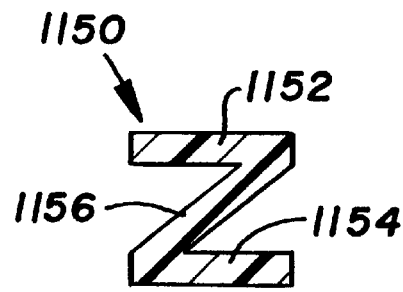

As FIG. 11f shows, a sixth alternative cross-sectional configuration 1150 of the structural member of the present invention has the appearance of a Z-shape. Configuration 1150 has two sides 1152 and 1154 which are connected by central member 1156 which runs in a diagonal direction to the sides. Preferably, the outer edges of sides 1152 and 1154 are flat.

Figure 11G:
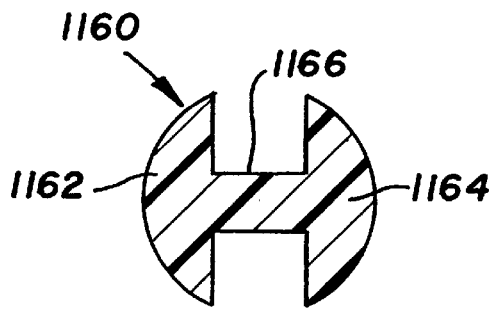

Referring now to FIG. 11g, a seventh alternative cross-sectional configuration 1160 of the structural member has a generally H-shaped or I-shaped appearance. Configuration 1160 includes two sides 1162 and 1164 which are joined by a center member 1166. Preferably, sides 1162 and 1164 each have a curved outer edge, creating a generally round cross-sectional outline.

Figure 11H:
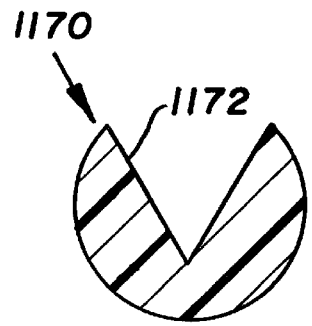

FIG. 11h shows an eighth alternative configuration 1170 of the cross-section of the structural member of the present invention. Configuration 1170 has a V-shape, with a generally round cross-sectional outline. Configuration 1170 includes a pie-shaped notch 1172, which comprises less than half of the cross-sectional area of the structural member.

Figure 11I:
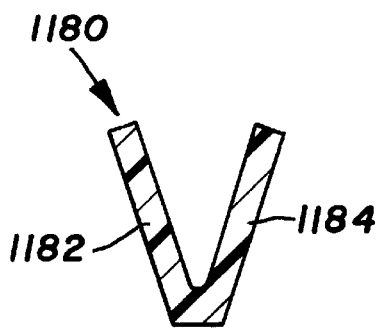

FIG. 11i illustrates a ninth alternative cross-sectional configuration 1180 of the structural member, which has a V-shape. Configuration 1180 has two flat sides 1182 and 1184, which are joined together at an end of each of the sides.

Figure 11J:
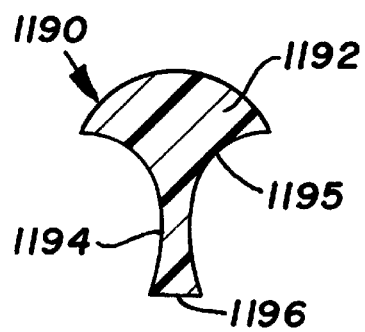

FIG. 11j depicts a tenth alternative configuration 1190 of the cross-section of the invented structural member. Configuration 1190 has a T-shape with a generally round cross-sectional outline, and includes two members 1192 and 1194 which extend in substantially perpendicular directions. A first end 1195 of member 1194 connects to the middle of member 1192. The second end 1196 of member 1194 and the outer edge of member 1192 are rounded to provide configuration 1190 with its generally circular cross-sectional outline.

Figure 12:
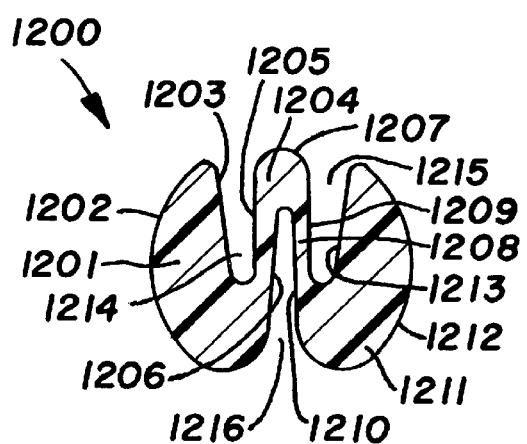
FIG. 12 represents an alternative cross-sectional configuration of the structural member.

Referring to FIG. 12, an alternative cross-sectional configuration 1200 of the invented structural member is shown. The structural member 1200 includes a first outer beam 1201 that has a generally convex outer face 1202 and a generally flat and straight inner face 1203. The first outer beam 1201 is connected to a first inner beam 1204 that has a generally flat and straight first face 1205 and a generally flat and straight second face 1206. The first inner beam 1204 terminates in an apex 1207 where it joins a second inner beam 1208 which has a generally flat and straight first face 1209 and a generally flat and straight second face 1210. The second inner beam 1208 is connected to a second outer beam 1211 which has a generally convex outer face 1212 and a generally flat and straight inner face 1213.

Torsional movement accommodating channels 1214 and 1215 are provided between the first outer beam 1201 and the first inner beam 1204, and between the second outer beam 1211 and the second inner beam 1208, respectively. A third torsional movement accommodating channel 1216 is also provided between the first outer beam 1201 and the second outer beam 1211, and exists, as depicted, partially between the first inner beam 1204 and the second inner beam 1208.

Figure 14:
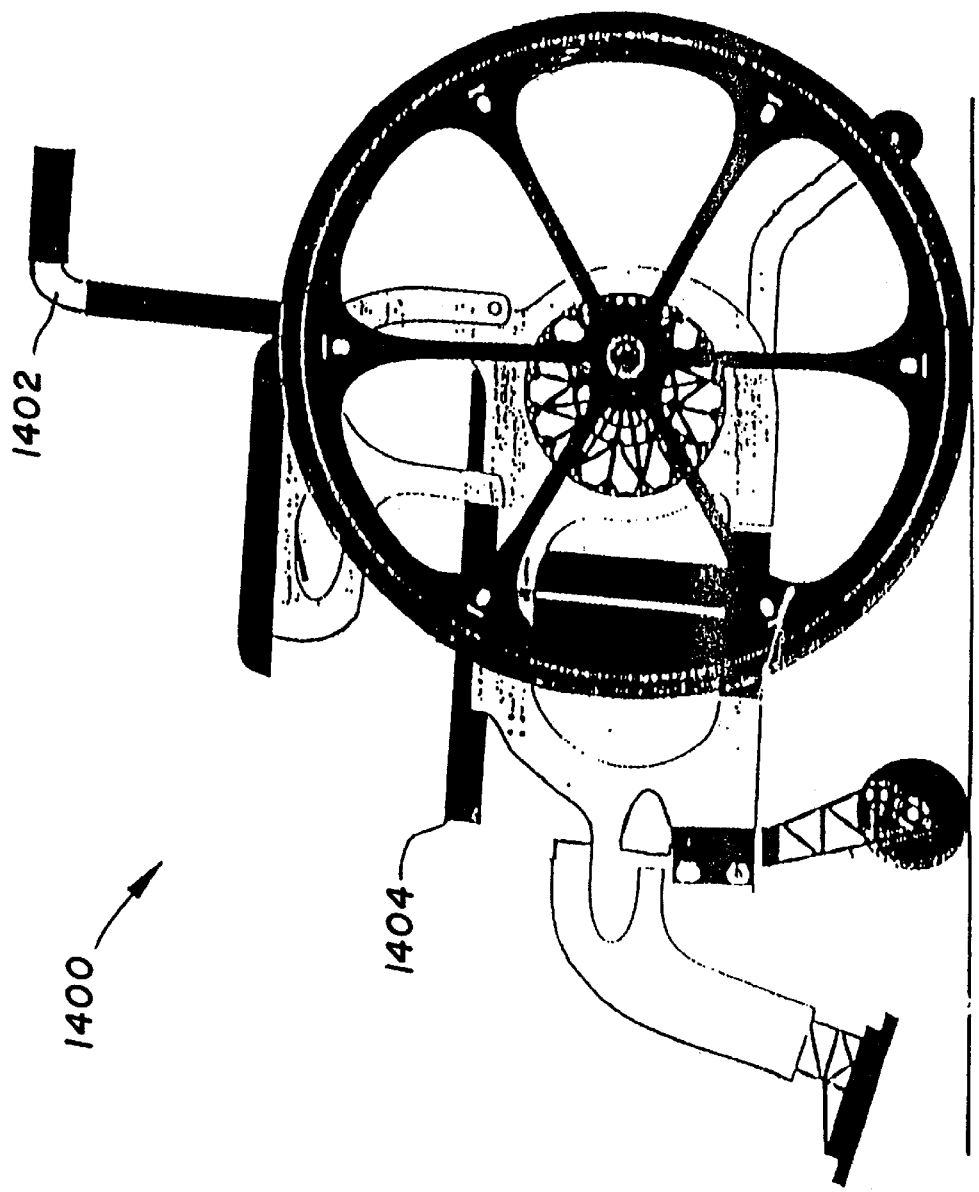
FIG. 14 shows a wheelchair which includes structural members which may be made in accordance with the configurations of the present invention.

With reference to FIG. 14, several of the structural members of a wheelchair 1400 may be made in accordance with the structural member of the present invention. In the preferred embodiment, wheelchair push handles 1402 and wheelchair cross-brace seat support members 1404 have the structure best represented by FIGS. 1, 2, 4, 5 and 6.

In the preferred embodiment, the structural member is a unitary structure which is injected molded. Injection molding reduces the cost of fabricating a fiber reinforced thermoplastic structural member compared to conventional methods of producing fiber reinforced plastic products.

The invented structural member is preferably made from a fiber-reinforced plastic material. The most preferred material for use with the present invention is referred to herein as long fiber reinforced thermoplastic, wherein the fiber length is about three hundred times the fiber diameter or more. Long fiber reinforced thermoplastic material is particularly suited for use in structural members because of its three-dimensional strength and stiffness. Thus, the long fiber reinforced thermoplastic material imparts the structural member with high strength and high stiffness in a plurality of planes and directions.

The long fiber reinforced thermoplastic material used in the present invention is preferably prepared by melting the thermoplastic resin and applying the melted resin to continuous yarns of fiber by methods known in the art such a pressurized pultrusion, fluidized bed coating, and wire coating. The plastic-impregnated yarns are then chopped to the desired lengths. Thus, in the long fiber reinforced thermoplastic materials of the present invention, the fibers are generally the same length as the pellet, which in turn, can be cut to any desired length.

In accordance with the present invention, the long fiber reinforced thermoplastic material can preferably be injection molded using an injection molding device having a screw-type injection system. Other molding techniques can also be used in accordance with the present invention. When a screw-type injection system is used, the fibers will be broken into segments shorter than those delivered in the pellets. Nevertheless, the preferred material of the present invention has fibers of an average length of at least about four millimeters.

Important to the advantages provided by the present invention is the characteristic that when long fiber reinforced thermoplastic material is injected into a mold, preferably one forming structures having at least a minimum thickness, the long fibers become entangled with each other. Entangled fibers provide increased strength and stiffness in the direction of flow within the mold.

It will be appreciated that the term "entangled," as used herein, means that a portion of the fibers found within the long fiber reinforced thermoplastic material overlap each other to some extent. In some cases, the entanglement may be random and chaotic while in other cases the entanglement may be ordered, or some combination of both.

The preferred plastic component of the long fiber reinforced thermoplastic material is one which is a tough, non-brittle thermoplastic including, without limitation, polyamide, copolyester, polycarbonate, and others. The preferred fiber component of the long fiber reinforced thermoplastic material is a high modulus, high strength, low density fiber such as carbon fiber. The preferred length of the pellets, and hence the length of the fibers in the pellets, is from about 8 mm to about 12 mm. It will be appreciated by those of skill in the art that when injection molding techniques are used, they should be evaluated to make sure that the length of the fibers are maintained as much as possible in order to maintain the advantages of the present invention.

In the preferred embodiment, the material used is thermoplastic (as opposed to thermoset plastic) filled with reinforcing fibers. Isoplast 101 LGF 40 available from the Dow Chemical Company of Midland, Mich. is preferred. This is 40% Isoplast 101 thermoplastic resin and 60% fiberglass fiber pre-formed into cylindrical pellets which are ready to injection mold. Many materials suitable for injection molding are known in the art. In alternative embodiments of the invention, other materials could be used for manufacture of products embodying the invention. Thermoplastic without reinforcing fibers, injectable metals, injectable quick-setting fiber-reinforced thermoset plastics, or any other injectable, quickly solidifying structural material could be used in other embodiments of the invention, such as NYLON 6 and NYLON 6—6 (polyamides) available from DuPont, PPS (polyphenelyne sulfide), high density polyethylene and polypropylene. Graphite (carbon) fiber commonly available commercially can be used as the reinforcing fiber, standard modulus moderate strength TORAY T-700 graphite, and others can be used. An equally suitable standard modulus standard strength fiber which could be used is HERCULES AS-4, manufactured by Hercules, Inc. of Wilmington, Del. Alternatively, intermediate modulus high strength graphite fibers such as TORAY M 30 and HERCULES IM-7 may be used. Aramid fibers such as KEVLAR 49 and TWARON as well as glass fibers such as E-glass and S2 glass available from Dow-Corning may be used. PPS (polyphenaline sulfide), PET (polyester teraphalate), ABS (acrylonitrile butadiene styrene), polycarbonate, or other structural thermoplastics could be used to make products embodying the inventive concept.

Molding of the invented components takes place with standard industry-available molding machines with molds of appropriate shape that are known to persons of ordinary skill in the art.

Alternatively, any variety of known reinforcing fibers and plastics, resins and fibers, metals, wood, ceramic or other materials could be used to construct the invented structural member. The use of fiber-reinforced thermoplastic is preferred for making the invented structural member due to its ease of manufacture by inexpensive injection molding processes, its durability in the finished product, and its inherent shock absorbing qualities that tend to cause shock and vibration to be absorbed by the structural member rather than by the user, thereby contributing to user comfort.

Figure 13:
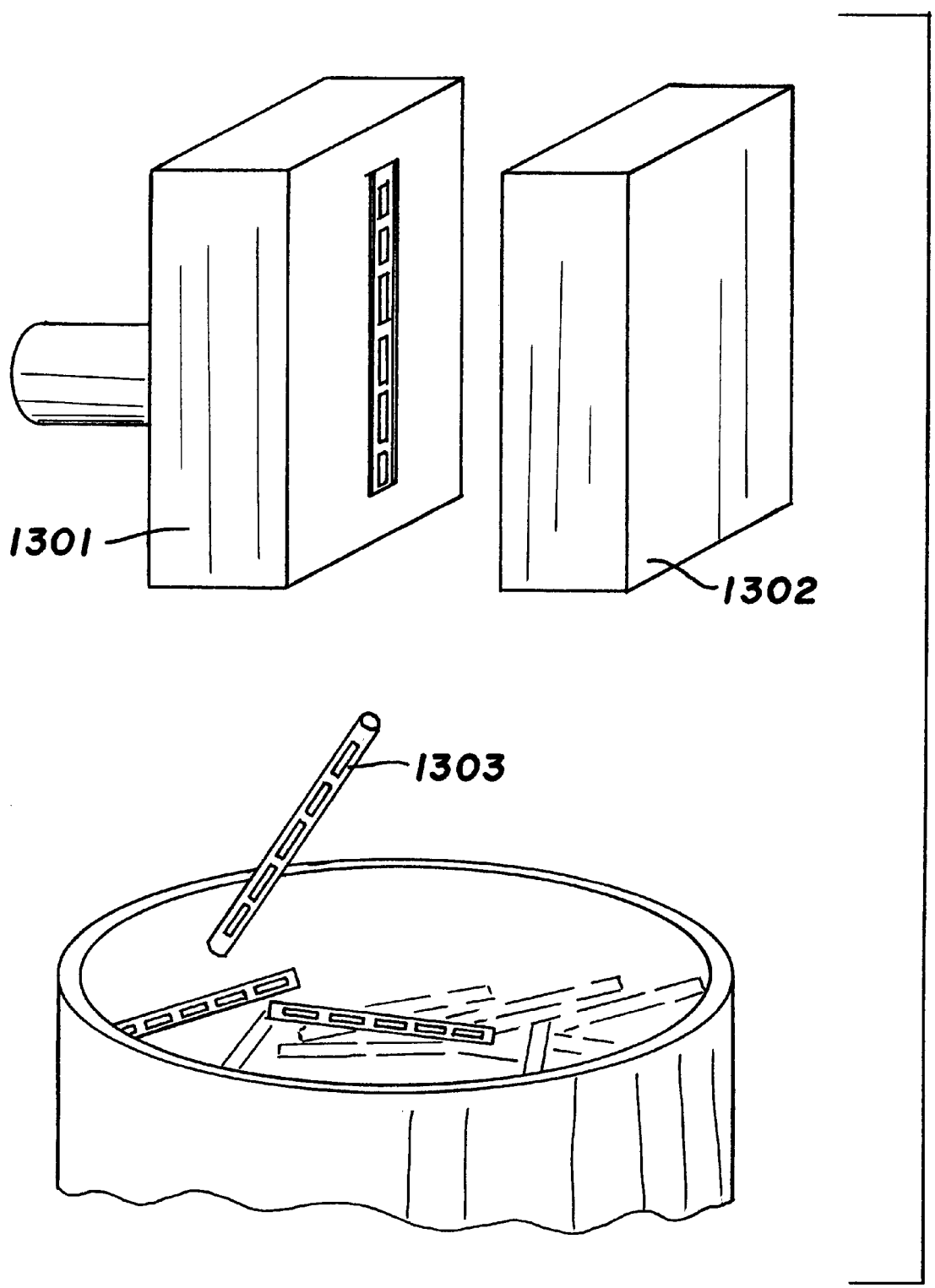
FIG. 13 illustrates a preferred injection molding method of manufacture according to the present invention.

Referring to FIG. 13, two opposing mold halves 1301 and 1302 are depicted in separated position and from which a finished structural member 1303 has recently fallen. The mold halves 1301 and 1302 could be installed on any standard injection molding machine commonly available and used to mold the structural member 1303 as described above from fiber-reinforced thermoplastic. Typically, an injection molding machine can be run on 30 to 60 second cycles, producing one structural member every cycle if a single cavity mold is used. More structure members (such as 2, 4, 8, etc.) can be produced per cycle by using a multi-cavity mold.

While the present invention has been described and illustrated in conjunction with a number of specific embodiments, those of ordinary skill in the art will appreciate that variations and modifications may be made without departing from the principles of the invention as herein illustrated, described and claimed.

The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

What is claimed is:

1. An elongate structural member suitable for wheelchair frame structural applications, adapted to substantially resist longitudinal compression while absorbing transverse shock and further adapted when used in such applications to deform elastically in response to torsional and transversely applied loads, said structural member including:

an elongate and continuous structural section formed of a resilient structural material and including a longitudinally extending first thin wall, a longitudinally extending second thin wall, a longitudinally extending apex region along which the first wall and second wall are coupled integrally with respect to one another, and a longitudinally extending first channel between the first and second walls, said structural section having a generally V-shaped cross-section; and a plurality of stiffening regions arranged along the structural section in longitudinally spaced apart relation to one another, wherein the structural material at each of the stiffening regions extends transversely from the first wall to the second wall to occupy and at least partially fill the first channel;

wherein the first wall and the second wall are adapted to undergo resilient beam twisting and flexure in response to torsional and transverse loads applied to the structural section to allow the structural section to undergo twisting about a longitudinal axis in response to torsional loads and to undergo flexure about transverse axes in response to transverse loads; and wherein the stiffening regions are arranged at predetermined longitudinal distances from one another to selectively increase a resistance of the structural section to said twisting and said flexure, whereby the structural section, when in use in a wheelchair frame structural application, is adapted to absorb transverse shock and to undergo controlled elastic deformation from an unstressed configuration in response to the torsional and transverse loads, and further is adapted to resiliently return to the unstressed configuration upon removal of the torsional and transverse loads.

2. The structural member of claim 1 wherein:
said first and second thin walls have rounded outer surfaces, whereby the structural section has a substantially circular profile in transverse planes.

3. The structural member of claim 1 wherein:
said stiffening regions are disk-shaped.

4. The structural member of claim 3 wherein:
the first and second walls have curved outer surfaces, whereby the structural section has a substantially circular profile in transverse planes; and
wherein the disk-shaped stiffening regions have circular disk profiles in transverse planes, substantially the same size as the circular profile of the structural section.

5. The structural member of claim 3 wherein:
said disk-shaped stiffening regions are integral with the structural section.

6. The structural member of claim 1 wherein:
said stiffening regions are spaced at even intervals from one another.

7. The structural member of claim 1 wherein:
said stiffening regions are spaced at uneven intervals from one another.

8. An elongate structural member suitable for wheelchair frame structural applications, adapted to substantially resist longitudinal compression while absorbing transverse shock and further adapted when used in such applications to deform elastically in response to torsional and transversely applied loads, said structural member including:

an elongate and continuous structural section formed of a resilient structural material and including a longitudinally extending first thin wall, a longitudinally extending second thin wall, a longitudinally extending apex region along which the first wall and second wall are coupled integrally with respect to one another, and a longitudinally extending first channel between the first and second walls, wherein the apex region of the structural section includes a longitudinally extending third thin wall coupled integrally to the first and second walls and cooperating with the first and second walls to form a longitudinally extending second channel between the second and third walls, with the first channel disposed between the first and third walls; and a plurality of stiffening regions arranged along the structural section in longitudinally spaced apart relation to one another, wherein the structural material at each of the stiffening regions extends transversely from the first wall to the second wall to occupy and at least partially fill the first channel;

wherein the first wall and the second wall are adapted to undergo resilient beam twisting and flexure in response to torsional and transverse loads applied to the structural section to allow the structural section to undergo twisting about a longitudinal axis in response to torsional loads and to undergo flexure about transverse axes in response to transverse loads; and wherein the stiffening regions are arranged at predetermined longitudinal distances from one another to selectively increase a resistance of the structural section to said twisting and said flexure, whereby the structural section, when in use in a wheelchair frame structural application, is adapted to absorb transverse shock and to undergo controlled elastic deformation from an unstressed configuration in response to the torsional and transverse loads, and further is adapted to resiliently return to the unstressed configuration upon removal of the torsional and transverse loads.

9. The structural member of claim 8 wherein:
said stiffening regions are disk-shaped.

10. The structural member of claim 8 wherein:
the elongate structural section has a generally W-shaped cross-section.

11. The structural member of claim 10 wherein:
said first and second walls have curved outer surfaces, whereby the structural section has a substantially circular profile in transverse planes.

12. The structural member of claim 8 wherein:
said structural section has a generally Z-shaped cross-section.

13. The structural member of claim 12 wherein:

said first and second walls have rounded outer surfaces, whereby the structural section has a substantially circular profile in transverse planes.

14. The structural member of claim 8 wherein:

said structural section has a generally E-shaped cross-section.

15. The structural member of claim 14 wherein:

the first and second walls have curved outer surfaces, whereby the structural section has a substantially circular profile in transverse planes.

16. The structural member of claim 8 further including:

a longitudinally extending fourth thin wall coupled integrally to the first, second and third walls, and disposed between the third wall and the second wall to define a longitudinally extending third channel between the third and fourth walls and to locate the second channel between the second and third walls.

17. The structural member of claim 16 wherein:

said structural section has a generally W-shaped cross-section.

18. The structural member of claim 16 wherein:

the first and second walls have curved outer surfaces, whereby the structural section has a substantially circular profile in transverse planes.

19. An elongate structural member suitable for wheelchair frame structural applications, adapted to substantially resist longitudinal compression while absorbing transverse shock and further adapted when used in such applications to deform elastically in response to torsional and transversely applied loads, said structural member including:

an elongate and continuous structural section formed of a resilient structural material and including a longitudinally extending first thin wall, a longitudinally extending second thin wall, a longitudinally extending apex region along which the first wall and second wall are coupled integrally with respect to one another, and a longitudinally extending first channel between the first and second walls; and a plurality of stiffening regions arranged along the structural section in longitudinally spaced apart relation to one another, wherein the structural material at each of the stiffening regions extends transversely from the first wall to the second wall to occupy and at least partially fill the first channel;

wherein the apex region of the structural section includes a longitudinally extending third thin wall coupled integrally to the first and second walls and cooperating with the first and second walls to form a longitudinally extending second channel between the first and second walls, with the first channel and the second channel disposed on opposite sides of the third wall;

wherein the first and second walls have curved outer surfaces, whereby the structural section has a substantially circular profile in transverse planes;

wherein the first wall and the second wall are adapted to undergo resilient beam twisting and flexure in response to torsional and transverse loads applied to the structural section to allow the structural section to undergo twisting about a longitudinal axis in response to torsional loads and to undergo flexure about transverse axes in response to transverse loads; and wherein the stiffening regions are arranged at predetermined longitudinal distances from one another to selectively increase a resistance of the structural section to said twisting and said flexure, whereby the structural section, when in use in a wheelchair frame structural application, is adapted to absorb transverse shock and to undergo controlled elastic deformation from an unstressed configuration in response to the torsional and transverse loads, and further is adapted to resiliently return to the unstressed configuration upon removal of the torsional and transverse loads.

20. The structural member of claim 19 wherein:

said stiffening regions are disk-shaped.

\* \* \* \* \*